(12) United States Patent (10) Patent No.: US 12,662,379 B2

May et al. (45) Date of Patent: Jun. 23, 2026

---

(54) PROCESS AND APPARATUS TO RECOVER HELIUM

(71) Applicant: The University of Western Australia, Crawley (AU)

(72) Inventors: Eric Freemantle May, Crawley (AU); Roman Weh, Crawley (AU); Gongkui Xiao, Crawley (AU)

(73) Assignee: The University of Western Australia, Crawley (AU)

( * ) Notice: Subject to any disclaimer, the term of this patent is extended or adjusted under 35 U.S.C. 154(b) by 388 days.

(21) Appl. No.: 18/570,557

(22) PCT Filed: Jun. 16, 2022

(86) PCT No.: PCT/AU2022/050602
§ 371 (c)(1),
(2) Date: Dec. 14, 2023

(87) PCT Pub. No.: WO2022/261715
PCT Pub. Date: Dec. 22, 2022

(65) Prior Publication Data
US 2024/0217821 A1 Jul. 4, 2024

(30) Foreign Application Priority Data

Jun. 17, 2021 (AU) ................................. 2021901823

(51) Int. Cl.
*C01B 23/00* (2006.01)

(52) U.S. Cl.
CPC .. *C01B 23/0052* (2013.01); *C01B 2210/0014* (2013.01); *C01B 2210/0028* (2013.01);
(Continued)

(58) Field of Classification Search
None
See application file for complete search history.

(56) References Cited

U.S. PATENT DOCUMENTS 12,472,458 B2 * 11/2025 Wang ................. B01D 53/0476
12,492,864 B1 * 12/2025 Ebert ..................... F25J 1/0045
(Continued)

FOREIGN PATENT DOCUMENTS

WO WO-2022261715 A1 * 12/2022 ......... C01B 23/0052

OTHER PUBLICATIONS

Florit, Federico; "On the Design of a Dual Reflux Pressure Swing Adsorption Process", Jun. 20, 2024, Industrial & Engineering Chemistry Research, https://doi.org/10.1021/acs.iecr.4c01397, all pages (Year: 2024).*

(Continued)

*Primary Examiner* — Brit E. Anbacht
(74) *Attorney, Agent, or Firm* — Osha Bergman Watanabe & Burton LLP

(57) ABSTRACT

An apparatus and a process to recover high purity helium from a low helium content feed stream are disclosed. The apparatus includes a first dual reflux pressure swing adsorption (DRPSA) unit and a second DRPSA unit, each unit comprising a high pressure adsorption column and a low pressure adsorption column configured in fluid communication with the high pressure adsorption column. The first DRPSA unit is arranged to receive and separate the feed stream into a first reflux product and a first heavy product and circulate the first reflux product and the first heavy product between the high and low pressure adsorption columns to produce an intermediate helium-enriched stream. The second DRPSA unit is arranged to receive and separate the intermediate helium-enriched stream into a second reflux product and a second heavy product and circulate the second reflux product and the second heavy product between the high and low pressure adsorption columns to produce a high purity helium stream and a waste stream containing helium. The waste stream from the second DRPSA unit is recycled (Continued)

to one of a plurality of locations in the first DRPSA unit to increase helium recovery in the high purity helium stream produced in the second DRPSA unit.

33 Claims, 4 Drawing Sheets

(52) U.S. Cl.
CPC ................. *C01B 2210/0031* (2013.01); *C01B 2210/0046* (2013.01)

(56) References Cited

U.S. PATENT DOCUMENTS

2017/0045290 A1 * 2/2017 Ploeger .................... F25J 3/061
2018/0104640 A1 4/2018 May et al.

OTHER PUBLICATIONS

International Search Report issued in Application No. PCT/AU2022/050602, mailed on Aug. 4, 2022 (3 pages).
Written Opinion issued in Application No. PCT/AU2022/050602, mailed on Aug. 4, 2022 (4 pages).

* cited by examiner

PROCESS AND APPARATUS TO RECOVER HELIUM

TECHNICAL FIELD

The disclosure relates to a process and apparatus to recover high purity helium from a low helium content gas. The disclosure also relates to a process and apparatus to recover helium and methane from hydrocarbon gas.

BACKGROUND

The discussion of the background to the disclosure is intended to facilitate an understanding of the disclosure. However, it should be appreciated that the discussion is not an acknowledgement or admission that any of the material referred to was published, known or part of the common general knowledge as at the priority date of the application.

Helium is an inert noble gas that exhibits a range of unique properties such as, small molecular size (2.6 Å), low molecular weight (4 $g \cdot mol^{-1}$), low normal boiling point (4.2 K) and high thermal conductivity. These physical and chemical properties are essential in a variety of critical applications: leak detection, cryogenic cooling for superconductors in magnetic resonance imaging, inert atmosphere control, and as a chromatography carrier gas. There have been several periods of sustained helium shortage in the past, and the current one, "Helium Shortage 3.0", commenced in 2006 because of the increasing demand and limited supply of helium.

Helium is generally extracted from natural gas. Conventionally, it was only viable to produce helium from the overhead stream of a cryogenic nitrogen rejection unit (NRU) like those frequently installed in mega-scale liquefied natural gas (LNG) production trains because helium concentration in most natural gas sources is prohibitively low for economic extraction. Consequently, helium supply is increasingly constrained by the number of large-scale LNG plants in the world which have the capacity to recover helium. To increase helium supply, processes not depending on the liquefaction of natural gas, such as membrane and adsorption technologies, are becoming increasingly attractive because of their lower cost and the ability to retrofit gas plants with these technologies.

Membrane systems usually operate at ambient temperature and are capable of recovering helium because of the high permeability of helium through the membrane compared to the other species present in natural gas. Systems solely based on membranes, however, often require several separation stages to increase the helium concentration to a desired level due to the poor selectivity of He over $N_2$, which leads to increased operational and investment costs due to the compressors required for inter-stage compression. While it is possible that membrane-based systems could potentially replace cryogenic processes for bulk He/$N_2$ separation they are not currently adapted to produce high helium purity (>95%).

By contrast, pressure/vacuum swing adsorption (P/VSA) has been reported as being capable of recovering and upgrading high purity helium from natural gas sources. Pressure swing adsorption (PSA) is an established technology employed to separate gas mixtures by exploiting differences in the adsorption capacities of the constituent gases, or, in a few industrial examples, by exploiting differences in sorption rates to achieve a kinetic selectivity. A continuous adsorption process can be realised with multiple beds operating in cycles of high-pressure adsorption steps and low-pressure regeneration or desorption steps together with intermediate bed pressurisation steps. Such a stripping-type PSA process can be designed by selection an appropriate adsorbent operating pressures, flow regime and step durations to remove a target gas from a mixture to a very low concentration (e.g. <100 ppmv).

A helium recovery process that captures 95% of the helium in the feed stream and that generates a product stream of 99.999% purity has been achieved with an 8-bed 2-stage PSA system from a 4% He+26% hydrocarbon+70% $N_2$ feed mixture. However, the process requires a high-pressure ratio of 34.5 with a high pressure of 345 kPa and a low pressure of 10 kPa. The high recovery rate is unusual—there are many P/VSA systems that can achieve high purity (>99%) He separation but they typically suffer from low helium recovery (<70%).

The process and apparatus as described herein seeks to overcome at least some of the disadvantages and problems described above.

SUMMARY

The disclosure relates to a non-cryogenic process and apparatus to recover high purity helium from a low helium content gas. The disclosure also provides a process and apparatus to recover separate streams of helium and methane from hydrocarbon gas.

In one aspect of the disclosure there is provided a process for recovering high purity helium from a feed stream comprising a low helium content gas, the process comprising:

a) introducing the feed stream into a high pressure adsorption column or a low pressure adsorption column of a first dual reflux pressure swing adsorption (DRPSA) unit;

b) separating the feed stream by adsorption into a first reflux product and a first heavy product and circulating the first reflux product and the first heavy product in said first DRPSA unit to produce an intermediate helium-enriched stream;

c) withdrawing the intermediate helium-enriched stream from the first DRPSA unit and introducing the intermediate helium-enriched stream to a high pressure adsorption column or a low pressure adsorption column of a second DRPSA unit;

d) separating the intermediate helium-enriched stream by adsorption into a second reflux product and a second heavy product and circulating the second reflux product and the second heavy product in said second DRPSA unit to produce a high purity helium stream and a waste stream containing helium;

e) withdrawing the waste stream containing helium from the second DRPSA unit and recycling thereof to one of a plurality of locations in the first DRPSA unit to increase helium recovery in the high purity helium stream produced in the second DRPSA unit.

The low helium content gas may be a binary gas mixture, a ternary gas mixture or a gas mixture with four or more components. The term 'low helium content' refers to less than 10 mol % helium.

In one aspect of the disclosure there is provided a process for separately recovering high purity helium and high purity methane from a feed stream comprising a hydrocarbon gas, the process comprising:

a) introducing the feed stream into a high pressure adsorption column or a low pressure adsorption column of a first dual reflux pressure swing adsorption (DRPSA) unit;

b) separating the feed stream by adsorption into a first reflux product and a first heavy product and circulating the first reflux product and the first heavy product in said first DRPSA unit to produce an intermediate helium-enriched stream and a high purity methane stream;

c) withdrawing the intermediate helium-enriched stream from the first DRPSA unit and introducing the intermediate helium-enriched stream to a high pressure adsorption column or a low pressure adsorption column of a second DRPSA unit;

d) separating the intermediate helium-enriched stream by adsorption into a second reflux product and a second heavy product and circulating the second reflux product and the second heavy product in said second DRPSA unit to produce a high purity helium stream and a waste stream containing helium;

e) withdrawing the waste stream containing helium from the second DRPSA unit and recycling thereof to one of a plurality of locations in the first DRPSA unit to increase helium recovery in the high purity helium stream produced in the second DRPSA unit.

In one embodiment, the feed stream is introduced to the high pressure adsorption column of the first DRPSA unit.

In one embodiment, the intermediate helium-enriched stream is introduced to the high pressure adsorption column of the second DRPSA unit.

In one embodiment, the intermediate helium-enriched stream is withdrawn from the high pressure adsorption column of the first DRPSA unit.

In one embodiment, the waste stream containing helium is withdrawn from the low pressure adsorption column of the second DRPSA unit.

In one embodiment, the process further comprises compressing the intermediate helium-enriched stream prior to introducing the intermediate helium-enriched stream to the high pressure adsorption column of the second DRPSA unit or compressing the waste stream containing helium prior to introducing said waste stream to the high pressure adsorption column of the first DRPSA.

In one embodiment, circulating said reflux products and heavy products in said respective first and second DRPSA unit comprises reducing a pressure of said reflux product prior to feeding thereof to the low pressure adsorption column and compressing said heavy product prior to feeding thereof to the high pressure adsorption column.

In one embodiment, said reflux products and heavy products in said DRPSA units may be circulated between the high and low pressure adsorption units until there is no significant change in a respective composition of said reflux products and heavy products. No significant change in a respective composition may mean that the change in the respective composition may be less than 5%, less than 1%, even less than 0.1% between cycles. In some embodiments, said reflux products and heavy products may be circulated the equivalent of up to five times before withdrawing streams produced therein.

In one embodiment, the feedstream is introduced into an intermediate portion of the high pressure adsorption column of the first DRPSA unit.

In one embodiment, the intermediate helium-enriched stream is introduced into an intermediate portion of the high pressure adsorption column of the second DRPSA unit.

In one embodiment, recycling the waste stream containing helium may comprise introducing said waste stream to an intermediate portion of the low pressure adsorption column of the first DRPSA unit, an intermediate portion of the high pressure adsorption column of the first DRPSA unit, or combining the waste stream with the feed stream prior to introducing the feedstream into the high pressure adsorption column of the first DRPSA. The selection of the location in the first DRPSA unit to which the waste stream is recycled will affect various aspects of the overall separation performance, such as helium recovery, helium purity, methane recovery, and the duty required to run the cycle. These aspects may be more or less important in different scenarios and may be traded-of each other to get the most desired separation performance in a given application.

In one embodiment the process is operated at a temperature maintained in a range of from 273 K to 333 K, in particular from 293 K to 303K.

In one embodiment, the high pressure adsorption columns are operated at a pressure of from 100 kPa to 1000 kPa and the low pressure adsorption columns are operated at a pressure of from about 0.01 kPa to 500 kPa, in particular from about 0.1 kPa to 300 kPa, and even more in particular from 1 kPa to about 150 kPa.

In one embodiment, said adsorption columns comprise an adsorbent having a selectivity for methane over nitrogen. The selectivity may be thermodynamic, kinetic or steric. In one embodiment, the selectivity for methane over nitrogen may be greater than 2, in particular greater than 5. Examples of adsorbents with suitable selectivity for methane over nitrogen include activated carbons, zeolites and ionic liquid zeolites, such as ILZ, an ionic liquid exchanged Y-type zeolite as described in International Patent Application PCT/AU2015/00588 which is incorporated by reference.

In one embodiment, the adsorbent in the adsorption columns of the first DRPSA may be the same or different to the adsorbent in the adsorption columns of the second DRPSA.

In one embodiment the feed stream may be a hydrocarbon gas. The hydrocarbon gas may be selected from a group comprising natural gas, boil off gas from LNG storage tanks, offgas from nitrogen recovery units (NRU) and nitrogen vent gas from LNG plants. The feed stream may comprise from about 0.01 mol % He to about 10 mol % He, optionally from about 1 mol % methane to about 99 mol % methane, with the balance being made up by nitrogen and/or one or more other gases such as argon, carbon dioxide, oxygen, hydrogen sulphide, ethane, propane and so forth.

In one embodiment, the intermediate helium-enriched stream comprises from about 5 to about 30 mol % helium.

In one embodiment, the waste stream comprises less than 20 mol % helium, even from about 1 to about 10 mol % helium.

In one embodiment, the high purity helium stream comprises >99 mol %, >99.9 mol %, >99.99 mol % or >99.999 mol % helium. In one embodiment, recovery of high purity helium is >90%, even >95%.

In one embodiment, the high purity methane stream comprises >96 mol % methane. In one embodiment, recovery of high purity methane is >90%, even about 99%.

In another aspect of the disclosure there is provided an apparatus to recover high purity helium from a feed stream comprising low helium content, the apparatus comprising:

a first dual reflux pressure swing adsorption (DRPSA) unit comprising a high pressure adsorption column and a low pressure adsorption column configured in fluid communication with the high pressure adsorption column, the first DRPSA unit being arranged to receive and separate the feed stream into a first reflux product and a first heavy product and circulate the first reflux product and the first heavy product between the high and low pressure adsorption columns to produce an intermediate helium-enriched stream;

a second DRPSA unit comprising a high pressure adsorption column and a low pressure adsorption column configured in fluid communication with the high pressure adsorption column, the second DRPSA unit being arranged to receive and separate the intermediate helium-enriched stream into a second reflux product and a second heavy product and circulate the second reflux product and the second heavy product between the high and low pressure adsorption columns to produce a high purity helium stream and a waste stream containing helium, wherein the first DRPSA is in fluid communication with the second DRPSA via a feedline for said helium-enriched stream, and, a recycle feedline arranged to withdraw said waste stream from the second DRPSA unit and recycle said waste stream to one of a plurality of locations in the first DRPSA unit to increase helium recovery in the high purity helium stream produced in the second DRPSA unit.

In another aspect of the disclosure there is provided an apparatus to recover helium and methane from a feed stream comprising methane, nitrogen and helium, the apparatus comprising:

a first dual reflux pressure swing adsorption (DRPSA) unit comprising a high pressure adsorption column and a low pressure adsorption column configured in fluid communication with the high pressure adsorption column, the first DRPSA unit being arranged to receive and separate the feed stream into a first reflux product and a first heavy product and circulate the first reflux product and the first heavy product between the high and low pressure adsorption columns to produce an intermediate helium-enriched stream and a high purity methane stream;

a second DRPSA unit comprising a high pressure adsorption column and a low pressure adsorption column configured in fluid communication with the high pressure adsorption column, the second DRPSA unit being arranged to receive and separate the intermediate helium-enriched stream into a second reflux product and a second heavy product and circulate the second reflux product and the second heavy product between the high and low pressure adsorption columns to produce a high purity helium stream and a waste stream containing helium, wherein the first DRPSA is in fluid communication with the second DRPSA via a feedline for said helium-enriched stream, and, a recycle feedline arranged to withdraw said waste stream from the second DRPSA unit and recycle said waste stream to one of a plurality of locations in the first DRPSA unit to increase helium recovery in the high purity helium stream produced in the second DRPSA unit.

In one embodiment the first DRPSA unit may be provided with a respective inlet in one or the other of the low pressure or high pressure adsorption columns to receive said feed stream.

In one embodiment the second DRPSA unit may be provided with a respective inlet in one or the other of the low pressure or high pressure adsorption columns to receive said intermediate helium-enriched stream.

In one embodiment the first DRPSA unit may be provided with a respective inlet in one or the other of the low pressure or high pressure adsorption columns to receive said waste stream.

In one embodiment, the apparatus further comprises a compressor disposed in line with the feedline.

In one embodiment, first and second DRPSA units further comprise respective gas expansion means to reduce pressure of said reflux product prior to feeding thereof to the low pressure adsorption column and respective compressor to compress said heavy product prior to feeding thereof to the high pressure adsorption column.

BRIEF DESCRIPTION OF DRAWINGS

Notwithstanding any other forms which may fall within the scope of the process and system as set forth in the Summary, specific embodiments will now be described with reference to the accompanying figures below.

DESCRIPTION OF EMBODIMENTS

Figure 1:
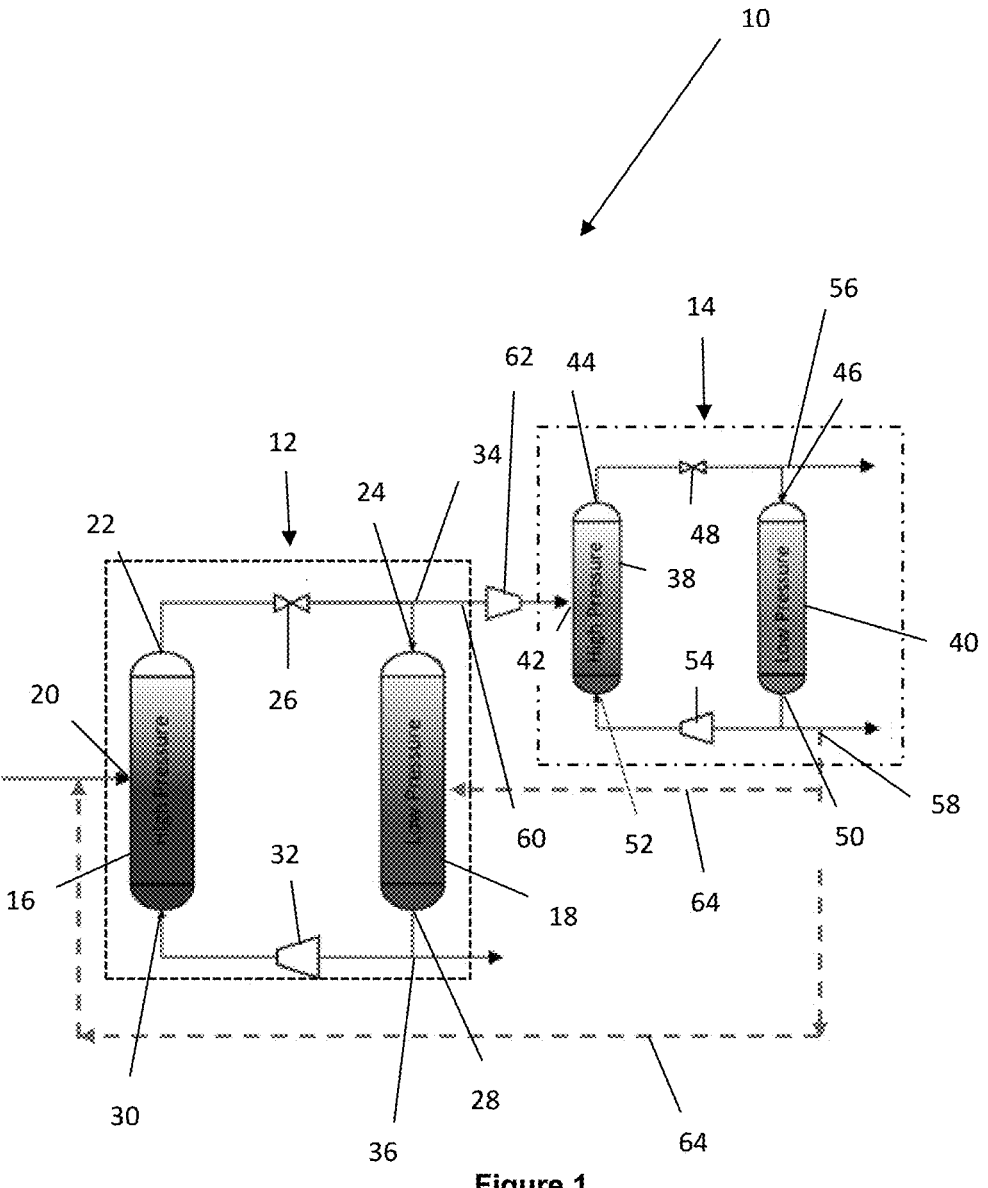
FIG. 1 is a schematic representation of one embodiment of an apparatus to recover helium and methane from a feed stream comprising methane, nitrogen and helium as disclosed herein.

The disclosure relates to a non-cryogenic process and apparatus to recover high purity helium from a low helium content gas. The disclosure also relates to a process and apparatus to recover helium and methane from hydrocarbon gas.

General Terms

Throughout this specification, unless specifically stated otherwise or the context requires otherwise, reference to a single step, composition of matter, group of steps or group of compositions of matter shall be taken to encompass one and a plurality (i.e. one or more) of those steps, compositions of matter, groups of steps or groups of compositions of matter. Thus, as used herein, the singular forms "a", "an" and "the" include plural aspects unless the context clearly dictates otherwise. For example, reference to "a" includes a single as well as two or more; reference to "an" includes a single as well as two or more; reference to "the" includes a single as well as two or more and so forth.

Each example of the present disclosure described herein is to be applied mutatis mutandis to each and every other example unless specifically stated otherwise. The present disclosure is not to be limited in scope by the specific examples described herein, which are intended for the purpose of exemplification only. Functionally-equivalent products, compositions and processes are clearly within the scope of the disclosure as described herein.

The term "and/or", e.g., "X and/or Y" shall be understood to mean either "X and Y" or "X or Y" and shall be taken to provide explicit support for both meanings or for either meaning.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Unless otherwise defined, all technical and scientific terms used herein have the same meaning as commonly understood by one of ordinary skill in the art to which this invention belongs. Although processes and materials similar or equivalent to those described herein can be used in the practice or testing of the present invention, suitable processes and materials are described below. In case of conflict, the present specification, including definitions, will control. In addition, the materials, processes, and examples are illustrative only and not intended to be limiting.

The term "about" as used herein means within 5%, and more preferably within 1%, of a given value or range. For example, "about 3.7%" means from 3.5 to 3.9%, preferably from 3.66 to 3.74%. When the term "about" is associated with a range of values, e.g., "about X % to Y %", the term "about" is intended to modify both the lower (X) and upper (Y) values of the recited range. For example, "about 20% to 40%" is equivalent to "about 20% to about 40%".

Specific Terms

The term 'adsorption unit' refers to any separation unit that separates a fluid stream into at least two streams using an adsorbent, one stream enriched in species that are more adsorbable and another stream enriched in species that are less adsorbable.

The term 'adsorbent' refers to a solid particulate substance capable of binding one or more gas molecules or solutes thereto by various surface interactions.

As used herein a 'separated portion' of a stream is a portion having a different chemical composition and different species concentrations from the stream from which it was taken. A separated portion may be, for example, a portion formed from a separation process in a separator.

The term 'depleted' means having a lesser mole % concentration of the indicated component than the original stream from which it was formed. 'Depleted' and 'lean' do not mean that the stream is completely lacking the indicated component.

The term 'enriched' means having a greater mole % concentration of the indicated component than the original stream from which it was formed.

As used herein, 'in fluid communication' or 'in fluid flow communication' means operatively connected by one or more conduits, manifolds, valves and the like, for transfer of fluid. A conduit is any pipe, tube, passageway or the like through which a fluid may be conveyed. An intermediate device, such as a pump, compressor, gas expander or vessel may be present between a first device in fluid flow communication with a second device unless explicitly stated otherwise.

The purity or recovery of a component in a separated gas stream (gas mixture) may be calculated according to the following formulae, respectively:

$$Purity = \frac{Moles\ of\ component\ in\ gas\ mixture}{Total\ moles\ in\ gas\ mixture} \times 100\% \quad (1)$$

8

-continued $$Recovery = \frac{Moles\ of\ component\ in\ gas\ mixture}{Moles\ of\ component\ in\ feed} \times 100\% \quad (2)$$

Cascading Dual Reflux Pressure Swing Adsorption Process and Apparatus

Embodiments described herein generally relate to a cascading dual reflux pressure swing adsorption process and system to recover helium and methane from a feed stream comprising methane, nitrogen and helium.

Pressure swing adsorption (PSA) is an established technique employed to separate gas mixtures by exploiting differences in the adsorption capacities of the constituent gases, or, in a few industrial examples, by exploiting differences in sorption rates to achieve a kinetic selectivity. A continuous adsorption process can be realised with multiple beds operating in cycles of high-pressure adsorption steps and low-pressure regeneration or desorption steps together with intermediate bed pressurisation steps. Such a stripping-type PSA process can be designed by selecting an appropriate adsorbent, operating pressures, flow regime and step durations to remove methane from nitrogen or air to a very low concentration (e.g. <100 ppmv). However, one limitation in the application of PSA to gas purification is that few PSA designs can produce both a high-purity light product (raffinate) from the adsorption steps and an enriched secondary product (extract) during the regeneration steps.

The dual reflux PSA (DRPSA) processes (also known as duplex PSA) combines the stripping and enriching PSA cycles into a single system with at least two beds where the feed gas is fed to an intermediate axial position along the adsorbent bed and some of each product stream is refluxed into the respective ends of the two adsorption columns. Dual reflux PSA processes have features similar to a continuous distillation process; for example when both gas species are competing for adsorption sites the phase equilibria (vapour-solid) is akin to vapour-liquid equilibria, and the use of light and heavy refluxes through the adsorbent beds is similar to the use of vapour and liquid refluxes in a distillation process.

A typical DRPSA cycle includes four basic steps: feed (FE), purge (PU), pressurization (PR) and blow down (BD) which occur in the pairs FE/PU and PR/BD so that every half-cycle is symmetric with each column's state swapping during the second half. Generally, the cycle may be configured so that the feed stream enters either the high pressure (PH) column or the low pressure (PL) column. Similarly, the cycle can be configured so that the pressure inversion is carried by transferring gas between the ends of the columns that is rich in either the heavy (more adsorbed) component (A), or in the light (less adsorbed) component (B). This leads to the four DRPSA configurations, referred to as PH-A, PH-B, PL-A and PL-B.

Referring to FIG. 1, there is shown an apparatus 10 to recover helium and methane from a feed stream comprising methane, nitrogen and helium. The feed stream may be a hydrocarbon gas selected from a group comprising natural gas, boil off gas from LNG storage tanks, offgas from nitrogen recovery units (NRU) and nitrogen vent gas from LNG plants. Alternatively the feed gas may be produced from a reservoir that contains helium and nitrogen but virtually no methane or other hydrocarbons. The feed stream may comprise from about 0.01 mol % to about 10 mol % He, optionally from about 1 mol % methane to about 99 mol % methane, with the balance being made up by nitrogen and/or one or more other gases such as ethane, propane, argon, carbon dioxide, oxygen, hydrogen sulphide, ethane, propane and so forth.

The apparatus 10 includes a first dual reflux pressure swing adsorption unit 12 and a second dual reflux pressure swing adsorption unit 14 arranged in fluid communication with one another in a 'cascade' configuration as will be described below.

The first dual reflux pressure swing adsorption unit 12 includes a high pressure adsorption column 16 and a low pressure adsorption column 18. The terms 'high pressure adsorption column' and 'low-pressure adsorption column', refer to an adsorption-type separation unit that operates at high pressure (from about 100 kPa to 1000 kPa) or low pressure (from 0.01 kPa to 500 kPa, in particular 0.1 kPa to about 300 kPa, even more particular 1 kPa to about 150 kPa), respectively.

The high pressure adsorption column 16 is provided with an inlet 20 disposed in an intermediate portion thereof to receive said gas mixture. It will be appreciated that in other embodiments, the inlet 20 may be disposed in an intermediate portion of the low pressure adsorption column 18.

The high pressure adsorption column 16 is configured in fluid communication with the low pressure adsorption column 18 in a manner whereby a first reflux product drawn from an upper end 22 of the high pressure adsorption column 16 may be passed to an upper end 24 of the low pressure adsorption column 18 via a valve 26 (or expansion means) and a first heavy product drawn from a lower end 28 of the low pressure adsorption column 18 may be passed to a lower end 30 of the high pressure adsorption column 16 via a compressor 32.

The first dual reflux pressure swing adsorption unit 12 also includes a first outlet 34 for an intermediate helium-enriched stream and a second outlet 36 for a high purity methane stream. The intermediate helium-enriched stream may be drawn and diverted from the upper end 22 of the high pressure adsorption column 16 and the high purity methane stream may be drawn and diverted from the lower end 28 of the low pressure adsorption column 18 after a desired number of cycles or until there is no significant change in a respective composition of the intermediate helium-enriched stream and said methane stream.

The second dual reflux pressure swing adsorption unit 14 includes a high pressure adsorption column 38 and a low pressure adsorption column 40.

The high pressure adsorption column 38 is provided with an inlet 42 disposed in an intermediate portion thereof to receive the intermediate helium-enriched stream produced by the first dual reflux pressure swing adsorption unit 12. It will be appreciated that in other embodiments, the inlet 42 may be disposed in an intermediate portion of the low pressure adsorption column 40.

The high pressure adsorption column 38 is configured in fluid communication with the low pressure adsorption column 40 in a manner whereby a second reflux product drawn from an upper end 44 of the high pressure adsorption column 38 may be passed to an upper end 46 of the low pressure adsorption column 40 via a valve 48 (or expansion means) and a second heavy product drawn from a lower end 50 of the low pressure adsorption column 40 may be passed to a lower end 52 of the high pressure adsorption column 38 via a compressor 54.

The second dual reflux pressure swing adsorption unit 14 also includes a first outlet 56 for a high purity helium stream and a second outlet 58 for a waste stream containing helium. The high purity helium stream may be drawn and diverted from the upper end 44 of the high pressure adsorption column 38 and said waste stream may be drawn and diverted from the lower end 50 of the low pressure adsorption column 40 after a desired number of cycles or until there is no significant change in a respective composition of said helium stream and said waste stream.

The inlet 42 of the second dual reflux pressure swing adsorption unit 14 is in fluid communication with the first outlet 34 of the first dual reflux pressure swing adsorption unit 12 via a feedline 60 to convey the intermediate helium-enriched stream and a compressor 62 disposed in-line with said feedline 60. It will be appreciated that in other embodiments, the compressor 62 may not be required depending on the relative pressures of the first outlet 34 of the first dual reflux pressure swing adsorption unit 12 and the inlet 42 of the second dual reflux pressure swing adsorption unit 14

The second outlet 58 of the second dual reflux pressure swing adsorption unit 14 is provided with a recycle feedline 64 arranged to withdraw said waste stream from the second dual reflux pressure swing adsorption unit 14 and recycle said waste stream to the first dual recycle pressure swing adsorption unit 12. The waste stream may be fed to an intermediate portion of the low pressure adsorption column 18 or be combined with the feed stream and fed to inlet 20 of the high pressure adsorption column 16. In other embodiments, the recycle feedline 64 may direct the waste stream to a lower portion of the high pressure adsorption column 16.

The high and low pressure adsorption columns 16, 18, 38, 40 contain an adsorbent having a selectivity for methane over nitrogen. The selectivity may be thermodynamic, kinetic or steric. In one embodiment, the selectivity for methane over nitrogen may be greater than 2, in particular greater than 5. In particular, the adsorbent has no or negligible selectivity for helium. Examples of adsorbents with suitable selectivity for methane over nitrogen include activated carbons, zeolites and ionic liquid zeolites, such as ILZ, an ionic liquid exchanged Y-type zeolite as described in International Patent Application PCT/AU2015/00588 which is incorporated by reference. The adsorbent in the adsorption columns 16, 18 of the first DRPSA 12 may be the same or different to the adsorbent in the adsorption columns 38, 40 of the second DRPSA 14.

The high and low pressure adsorption columns 16, 18 of the first DRPSA unit 12 may have a greater adsorption capacity than the high and low pressure adsorption columns 38, 40 of the second DRPSA unit 14. For example, the high and low pressure adsorption columns 16, 18 may have a greater volume (i.e. longer and/or larger diameter), and therefore contain a greater volume of adsorbent, than the high and low pressure adsorption columns 38, 40. For example, a bed volume ratio between the adsorption columns of the first DRPSA unit 12 and the second DRPSA unit 14 may be in a range from about 1:1 to 20:1. Alternatively, the high and low pressure adsorption columns 16, 18 may contain a first adsorbent having a greater adsorption capacity than a second adsorbent contained in the high and low pressure adsorption columns 38, 40.

It will be appreciated that the adsorption capacity of the first DRPSA unit 14 will be sufficient to process a pre-determined flow rate of the feed stream and produce a methane stream of a desired purity and an intermediate helium-enriched stream of a pre-determined composition. The adsorption capacity of the second DRPSA unit 16 will be determined, in part, by the flow rate of the intermediate helium-enriched stream produced by the first DRPSA unit 14 and the composition thereof.

In use, each adsorption column 16, 18, 38, 40 of the first and second DRPSA units 12, 14 undergoes six successive steps: (i) adsorption, (ii) pressure equalisation, (iii) blow-down, (iv) desorption, (v) pressure equalisation, and (vi) pressurisation, the high and low pressure adsorption columns 16, 18, of the first DRPSA unit 12 and the high and low pressure adsorption columns 38, 40 of the second DRPSA unit 14 operating in tandem with one another such that when the high pressure adsorption columns 16, 38 are undergoing the adsorption step, the low pressure adsorption columns 18, 40 are undergoing the desorption step. The time periods for each successive step may be about 60 s, although the length of each step may vary. Generally, each step will be synchronised.

The first and second DRPSA units 12, 14, may operate at a temperature and pressure effective for adsorption and desorption of methane and nitrogen. Said units may be operated at a temperature in a range of –50° C. to 100° C., in particular a range of 0° ° C. to 70° C. The pressure during adsorption may be from about 100 kPa to 1000 kPa. The pressure during desorption may be sufficient to cause desorption of methane and nitrogen, such as from 0.01 kPa to 500 kPa, in particular 0.01 kPa to about 300 kPa, even more particular 0.01 kPa to about 150 kPa.

In step (i) a feed gas comprising at least a ternary mixture of methane, nitrogen and helium, wherein the helium content is less than about 5 mol % or even less than about 1 mol %, may be fed via inlet 20 to an intermediate axial position of the high pressure adsorption column 16 of the first dual reflux pressure swing adsorption unit 12. Methane in the feed gas is selectively adsorbed by the adsorbent in said adsorption column 16, thereby generating a reflux product comprising a helium-enriched stream.

Following step (i), the adsorbent in adsorption column 16 is regenerated by reducing the pressure in steps (ii) and (iii), namely via counter-current pressure equalisation and blow-down step using the expansion means 26 to transfer the reflux product to the alternate adsorption column 18, whereby residual methane remaining in the reflux product is subsequently adsorbed by the adsorbent therein. Alternatively, reflux product may be transferred via a line (not shown) extending between the lower ends 28, 30 of the low and high pressure adsorption columns 18, 16, respectively. The adsorption column 16 then undergoes desorption in step (iv) thereby removing a heavy product comprising the adsorbed methane component of the feed gas. Desorption may be supported by a purge stream comprising the light reflux product. A tail gas produced from the desorption step (iv) comprises less than 0.05 mol % helium. It may be recirculated through the first DRPSA unit 12 or vented. The adsorption column 16 is then re-pressurised via pressure equalisation step (v) and pressurisation step (vi).

The reflux product and the heavy product may be circulated through the adsorption columns 16, 18 as described above until there is no significant change (<0.1 mol %) in the respective compositions of the helium-enriched stream and the methane stream over 5 consecutive cycles.

The resulting helium-enriched stream may comprise at least 5 times more helium than the feed gas, even up to 20 times more helium than the feed gas. For example, the helium-enriched stream may comprise from about 5 to about 30 mol % He.

The resulting methane stream may comprise greater than 96 mol % methane. At least 90% of methane in the feed gas is recovered in the methane stream.

The helium-enriched stream may be compressed in compressor 62 prior to feeding said compressed helium-enriched stream to an intermediate axial position of adsorption column 38 of the second DRPSA unit 14 via inlet 42. Residual methane in the helium-enriched stream and nitrogen is selectively adsorbed by the adsorbent in said adsorption column 38, thereby generating a reflux product comprising more than 99 mol % helium ('the pure helium stream'). The heavy product generated by desorption of the adsorption columns 38, 40 comprises mostly nitrogen, methane and a small amount of helium ('the waste stream').

The pure helium stream and the waste stream may be circulated through the adsorption columns 38, 40 as described above until there is no significant change in their respective compositions. Said streams may be circulated up to 5-10 times.

The recovery of He in the pure helium stream may be improved significantly when the waste stream is recycled to one of a plurality of positions in the first DRPSA unit 12. The waste stream may be directed to an intermediate portion of the low pressure adsorption column 18 or combined with the feed gas prior to introducing the feed gas into the high pressure adsorption column 16 of the first DRPSA unit 12 as described previously. In this way, the recovery of He in the pure helium stream may be increased from about 70% to at least 90%.

It will be appreciated by those skilled in the art that the timing of each phase (i)-(vi) in the first and second DRPSA units 12, 14, the first and second reflux flow rates, the recycle flow rate and the axial location at which the feed gas, the enriched helium stream and the waste stream are respectively introduced to said adsorption columns 16, 18, 38 will depend on several factors including, but not limited to, the helium content of the feed gas, methane content of the feed gas, feed flow rate and the adsorbent material including its adsorption capacity and selectivity.

The process and apparatus as described herein may achieve the following advantages:

Production of a pure helium stream having >99% He, even >99.99% from a feed gas having less than about 1% He Total helium recovery of at least 90%, even >95%, is achievable under mild operating conditions (i.e. ambient temperature and a pressure ratio of about 5 between the adsorption and desorption phases)

Simultaneous separation of a pure methane stream (>95%) with good recovery (>95%).

Various embodiments may be illustrated by the following examples. The examples are provided for illustrative purposes only and are not to be construed as limiting the scope or content of the disclosure in any way.

Example

Separation of high purity helium and methane from a feed gas comprising helium (1 mol %), methane (85 mol %) and nitrogen (14 mol %) was achieved with the apparatus 10 as shown in FIG. 1. The adsorbent used in the first dual reflux pressure swing adsorption unit 12 was ILZ, an ionic liquidic zeolite, having higher selectivity for methane over nitrogen. The adsorbent particles were pellets with an aspect ratio (D/L) of ~3/2. The adsorbent used in the second dual reflux pressure swing adsorption units 14 was zeolite 13X, a binderless zeolite 13X. The adsorbent particles were spheroids with a particle diameter ranging from 1.6 mm to 2.5 mm.

The operational process parameters are summarised in Table 1.

TABLE 1

Operational process parameters

| | First DRPSA unit | Second DRPSA unit |
|---|---|---|
| Inlet flow rate [SLPM] | 8.3 | 1.0 |
| Temperature (ambient) | 20-25° C. | |
| High Pressure ($P_H$) | 500 kPa | 505 kPa |
| Low Pressure ($P_L$) | 140 kPa | 140 kPa |
| Length of adsorption bed (m) | 2.0 | 0.98 |
| Diameter of adsorbent layer (m) | 0.07 | 0.035 |
| H/F(Ratio of heavy product flow rate to feed flow rate) | 7.3 | 0.86-0.90 |
| $R_L$/F(—) (Ratio of light reflux flow rateto feed flow rate) | 8.3 | 0.50 |
| $t_F$ (s) | 60 | 60 |

The flow rates of feed gas, heavy products and reflux products were controlled by mass flow controllers (MFC). The adsorption pressure in the adsorption columns was controlled by a back-pressure regulator (BPR) and was maintained at 500 kPa and 505 kPa, respectively. The desorption pressure in the adsorption columns was determined by the capacity of the compressors and the volumes of feed gas and/or reflux products introduced into the adsorption columns. Consequently, the desorption pressure varied for different cycle configurations and parameter combinations, in the range of 120 to 280 kPa.

Figure 2:
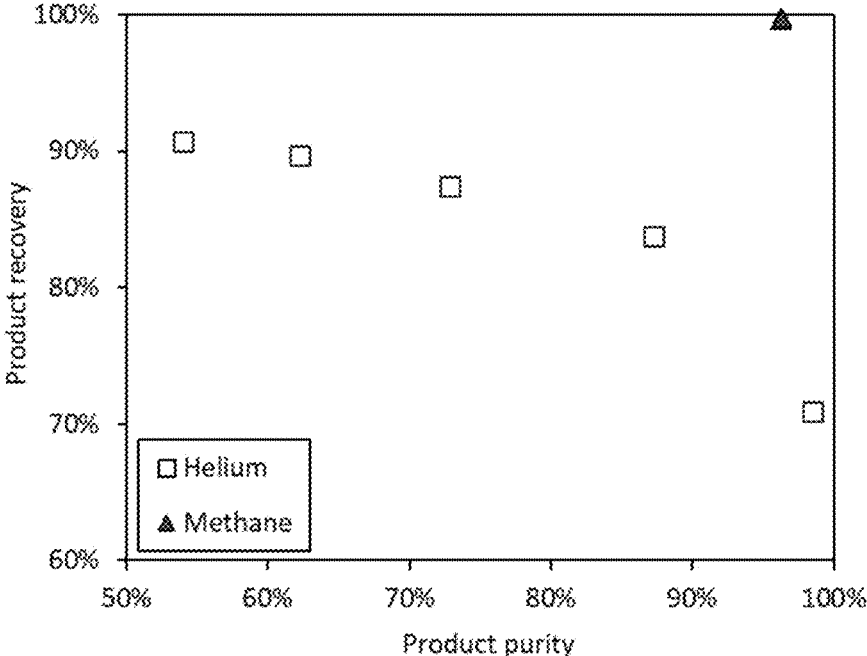
FIG. 2 is a graphical representation of the recovery (mol %) of helium compared to the purity (mol %) of helium separated from a feed stream comprising methane, nitrogen and helium by treatment in two cascading dual reflux pressure swing adsorption units (in the absence of recycling a waste stream containing helium) compared with the recovery (mol %) and purity (mol %) of methane separated from the same ternary gas mixture.

FIG. 2 shows the recovery (mol %) of helium compared to the purity (mol %) of helium separated from a feed stream comprising methane, nitrogen and helium by treatment in two cascading dual reflux pressure swing adsorption units in the absence of recycling a waste stream containing helium compared with the recovery (%) and purity (mol %) of methane separated from the same ternary gas mixture.

Figure 3:
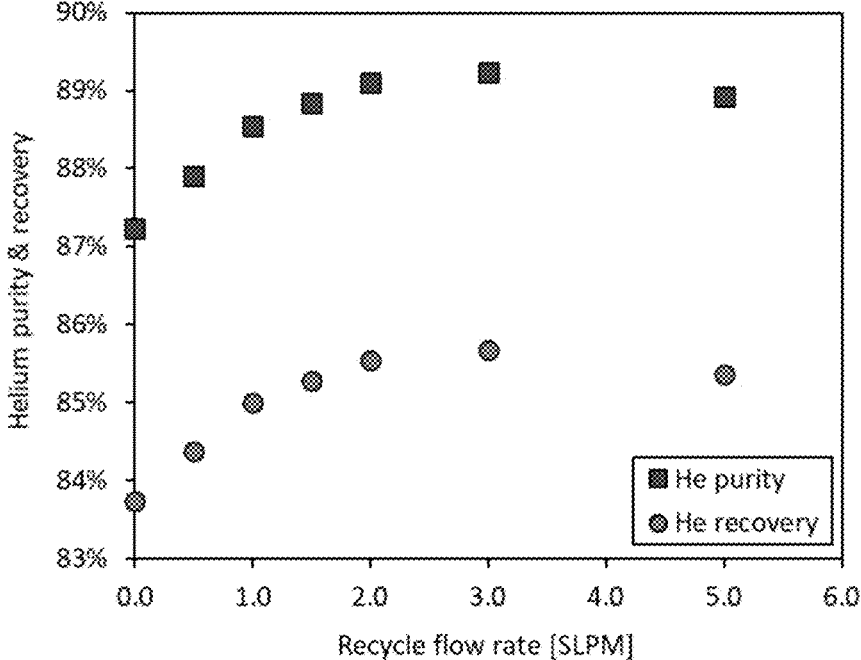
FIG. 3 is a graphical representation of the recovery (mol %) and purity (mol %) of helium separated from said feed stream in two cascading dual reflux pressure swing adsorption units configured to recycle said waste stream containing helium.

FIG. 3 shows the recovery (mol %) and purity (mol %) of helium separated from a rich methane feed stream in two cascading dual reflux pressure swing adsorption units configured to recycle a waste stream containing helium.

Figure 4:
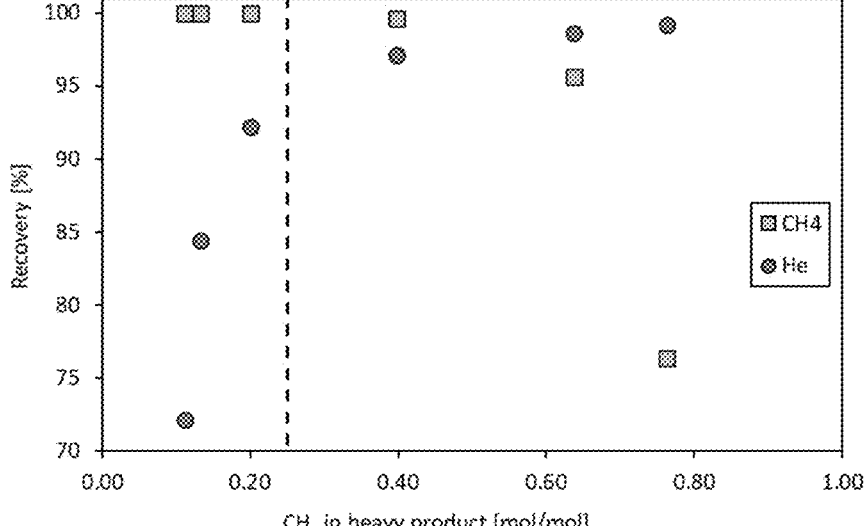
FIG. 4 is a graphical representation of the recovery (mol %) of helium and methane separated from a feed stream comprising methane, nitrogen and helium by treatment in two cascading dual reflux pressure swing adsorption units configured to recycle said waste stream containing helium.

FIG. 4 shows the recovery (mol %) of helium and methane separated from a lean methane feed stream by treatment in two cascading dual reflux pressure swing adsorption units configured to recycle said waste stream containing helium.

Tables 2 and 3 also compare the compositions of the feed gas, the separated methane stream, the intermediate helium-enriched stream, the waste stream and the pure helium stream obtained with recycling the waste stream and in the absence of recycling the waste stream, respectively.

TABLE 1

Resulting stream purity from rich methane feed stream when waste stream is recycled to first DRPSA unit

| Parameter | Feed | Methane Product | Intermediate Product | Waste | Helium Product |
|---|---|---|---|---|---|
| Flowrate (SLPM) | 8.33 | 7.33 | 3.02 | 2.00 | 0.08 |
| X(CH$_4$) (mol/mol) | 0.850 | 0.962 | 0.003 | 0.034 | 0.000 |
| X(N$_2$) (mol/mol) | 0.140 | 0.038 | 0.932 | 0.955 | 0.104 |
| X(He) (mol/mol) | 0.010 | 0.000 | 0.035 | 0.011 | 0.896 |

TABLE 3

Resulting stream purity from lean methane feed stream when waste stream is not recycled to first DRPSA unit

| | Feed | Methane Product | Intermediate Product | Waste | Helium Product |
|---|---|---|---|---|---|
| Flowrate (SLPM) | 1.33 | 0.33 | 1.00 | 0.90 | 0.10 |
| X(CH$_4$) (mol/mol) | 0.100 | 0.3987 | 0.0004 | 0.0005 | 0.000 |
| X(N$_2$) (mol/mol) | 0.890 | 0.6001 | 0.9866 | 0.9991 | 0.8743 |
| X(He) (mol/mol) | 0.010 | 0.0011 | 0.0130 | 0.0004 | 0.1257 |

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

In the claims which follow and in the preceding description except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A non-cryogenic process for recovering high purity helium from a feed stream comprising a low helium content gas, the process comprising:
   a) introducing the feed stream into a high pressure adsorption column or a low pressure adsorption column of a first dual reflux pressure swing adsorption (DRPSA) unit;
   b) separating the feed stream by adsorption into a first reflux product and a first heavy product and circulating the first reflux product and the first heavy product in said first DRPSA unit to produce an intermediate helium-enriched stream;
   c) withdrawing the intermediate helium-enriched stream from the first DRPSA unit and introducing the intermediate helium-enriched stream to a high pressure adsorption column or a low pressure adsorption column of a second DRPSA unit;
   d) separating the intermediate helium-enriched stream by adsorption into a second reflux product and a second heavy product and circulating the second reflux product and the second heavy product in said second DRPSA unit to produce a high purity helium stream and a waste stream containing helium; and
   e) withdrawing the waste stream containing helium from the second DRPSA unit and recycling thereof to one of a plurality of locations in the first DRPSA unit to increase helium recovery in the high purity helium stream produced in the second DRPSA unit.

2. The process according to claim 1, wherein the feed stream is introduced to the high pressure adsorption column of the first DRPSA unit.

3. The process according to claim 1, wherein the intermediate helium-enriched stream is introduced to the high pressure adsorption column of the second DRPSA unit.

4. The process according to claim 1, wherein the intermediate helium-enriched stream is withdrawn from the high pressure adsorption column of the first DRPSA unit.

5. The process according to claim 1, wherein the waste stream containing helium is withdrawn from the low pressure adsorption column of the second DRPSA unit.

6. The process according to claim 1, wherein the process further comprises compressing the intermediate helium-enriched stream prior to introducing the intermediate helium-enriched stream to the high pressure adsorption column of the second DRPSA unit or compressing the waste stream containing helium prior to introducing said waste stream to the high pressure adsorption column of the first DRPSA unit.

7. The process according to claim 1, wherein circulating said reflux products and heavy products in said respective first and second DRPSA unit comprises reducing a pressure of said reflux product prior to feeding thereof to the low pressure adsorption column and compressing said heavy product prior to feeding thereof to the high pressure adsorption column.

8. The process according to claim 1, wherein said reflux products and heavy products in said DRPSA units may be circulated up to five times before withdrawing streams produced therein.

9. The process according to claim 1, wherein the feed stream is introduced into an intermediate portion of the high pressure adsorption column of the first DRPSA unit.

10. The process according to claim 1, wherein the intermediate helium-enriched stream is introduced into an intermediate portion of the high pressure adsorption column of the second DRPSA unit.

11. The process according to claim 1, wherein recycling the waste stream containing helium may comprise introducing said waste stream to an intermediate portion of the low pressure adsorption column of the first DRPSA unit, an intermediate portion of the high pressure adsorption column of the first DRPSA unit, or combining the waste stream with the feed stream prior to introducing the feed stream into the high pressure adsorption column of the first DRPSA unit.

12. The process according to claim 1, wherein the first and second DRPSA units are operated at a temperature maintained in a range of from 273 K to 333 K.

13. The process according to claim 1, wherein the high pressure adsorption columns are operated at a pressure of from 100 kPa to 1000 kPa and the low pressure adsorption columns are operated at a pressure of between about 0.01 kPa to about 500 kPa.

14. The process according to claim 1, wherein said adsorption columns comprise an adsorbent having a selectivity for methane over nitrogen.

15. The process according to claim 14, wherein the adsorbent has a selectivity for methane over nitrogen greater than 2.

16. The process according to claim 14, wherein the adsorbent in the adsorptions columns of the first DRPSA is the same or different to the adsorbent in the adsorption columns of the second DRPSA.

17. The process according to claim 1, wherein the feed stream comprises a hydrocarbon gas.

18. The process according to claim 17, wherein the feed stream comprises from about 0.01 mol % He to about 10 mol % He, optionally from about 1 mol % methane to about 99 mol % methane, with the balance being made up by nitrogen and/or one or more other gases such as argon, carbon dioxide, oxygen, hydrogen sulphide, ethane, propane.

19. The process according to claim 1, wherein the intermediate helium-enriched stream comprises from about 5 mol % to about 30 mol % He.

20. The process according to claim 1, wherein the waste stream comprises less than 20 mol % He.

21. The process according to claim 20, wherein the waste stream comprises from about 1 mol % to about 10 mol % helium.

22. The process according to claim 1, the high purity helium stream comprises >99 mol % He.

23. The process according to claim 1, wherein recovery of high purity helium is >90%.

24. The process according to claim 1, wherein the high purity methane stream comprises >96 mol % methane.

25. The process according to claim 1, wherein recovery of high purity methane is >90%.

26. A non-cryogenic process for separately recovering high purity helium and high purity methane from a feed stream comprising methane, nitrogen and helium, the process comprising:
   a) introducing the feed stream into a high pressure adsorption column or a low pressure adsorption column of a first dual reflux pressure swing adsorption (DRPSA) unit;
   b) separating the feed stream by adsorption into a first reflux product and a first heavy product and circulating the first reflux product and the first heavy product thereof in said first DRPSA unit to produce an intermediate helium-enriched stream and a high purity methane stream;
   c) withdrawing the intermediate helium-enriched stream from first DRPSA unit and introducing the intermediate helium-enriched stream to a high pressure adsorption column or a low pressure adsorption column of a second DRPSA unit;
   d) separating the intermediate helium-enriched stream by adsorption into a second reflux product and a second heavy product and circulating the second reflux product and the second heavy product thereof in said second DRPSA unit to produce a high purity helium stream and a waste stream containing helium; and
   e) withdrawing the waste stream containing helium from the second DRPSA unit and recycling thereof to one of a plurality of locations in the first DRPSA unit to increase helium recovery in the high purity helium stream produced in the second DRPSA unit.

27. An apparatus to recover high purity helium from a feed stream comprising low helium content, the apparatus comprising:
   a first dual reflux pressure swing adsorption (DRPSA) unit comprising a high pressure adsorption column and a low pressure adsorption column configured in fluid communication with the high pressure adsorption column, the first DRPSA unit being arranged to receive and separate the feed stream into a first reflux product and a first heavy product and circulate the first reflux product and the first heavy product between the high and low pressure adsorption columns to produce an intermediate helium-enriched stream;
   a second DRPSA unit comprising a high pressure adsorption column and a low pressure adsorption column configured in fluid communication with the high pressure adsorption column, the second DRPSA unit being arranged to receive and separate the intermediate helium-enriched stream into a second reflux product and a second heavy product and circulate the second reflux product and the second heavy product between the high and low pressure adsorption columns to produce a high purity helium stream and a waste stream containing helium, wherein the first DRPSA is in fluid communication with the second DRPSA via a feedline for said helium-enriched stream, and a recycle feedline arranged to withdraw said waste stream from the second DRPSA unit and recycle said waste stream to one of a plurality of locations in the first DRPSA unit to increase helium recovery in the high purity helium stream produced in the second DRPSA unit.

28. The apparatus according to claim 27, wherein the first DRPSA unit is provided with a respective inlet in one or the other of the low pressure or high pressure adsorption columns to receive said waste stream.

29. The apparatus according to claim 27, wherein the second DRPSA unit is provided with a respective inlet in one or the other of the low pressure or high pressure adsorption columns to receive said intermediate helium-enriched stream.

30. The apparatus according to claim 27, wherein the first DRPSA unit is provided with a respective inlet in one or the other of the low pressure or high pressure adsorption columns to receive said waste stream.

31. The apparatus according to claim 27, wherein the apparatus further comprises a compressor disposed in line with the feedline.

32. The apparatus according to claim 27, wherein first and second DRPSA units further comprise respective gas expansion means to reduce pressure of said reflux product prior to feeding thereof to the low pressure adsorption column and respective compressor to compress said heavy product prior to feeding thereof to the high pressure adsorption column.

33. An apparatus to recover helium and methane from a feed stream comprising methane, nitrogen and helium, the apparatus comprising:

a first dual reflux pressure swing adsorption (DRPSA) unit comprising a high pressure adsorption column and a low pressure adsorption column configured in fluid communication with the high pressure adsorption column, the first DRPSA unit being arranged to receive and separate the feed stream into a first reflux product and a first heavy product and circulate the first reflux product and the first heavy product between the high and low pressure adsorption columns to produce an intermediate helium-enriched stream and a high purity methane stream;

a second DRPSA unit comprising a high pressure adsorption column and a low pressure adsorption column configured in fluid communication with the high pressure adsorption column, the second DRPSA unit being arranged to receive and separate the intermediate helium-enriched stream into a second reflux product and a second heavy product and circulate the second reflux product and the second heavy product between the high and low pressure adsorption columns to produce a high purity helium stream and a waste stream containing helium, wherein the first DRPSA is in fluid communication with the second DRPSA via a feedline for said helium-enriched stream, and a recycle feedline arranged to withdraw said waste stream from the second DRPSA unit and recycle said waste stream to one of a plurality of locations in the first DRPSA unit to increase helium recovery in the high purity helium stream produced in the second DRPSA unit.

* * * * *